Aug. 18, 1936.  K. B. HOWELL  2,051,299
PRESSURE CONTROL DEVICE
Filed Nov. 24, 1934  2 Sheets-Sheet 1
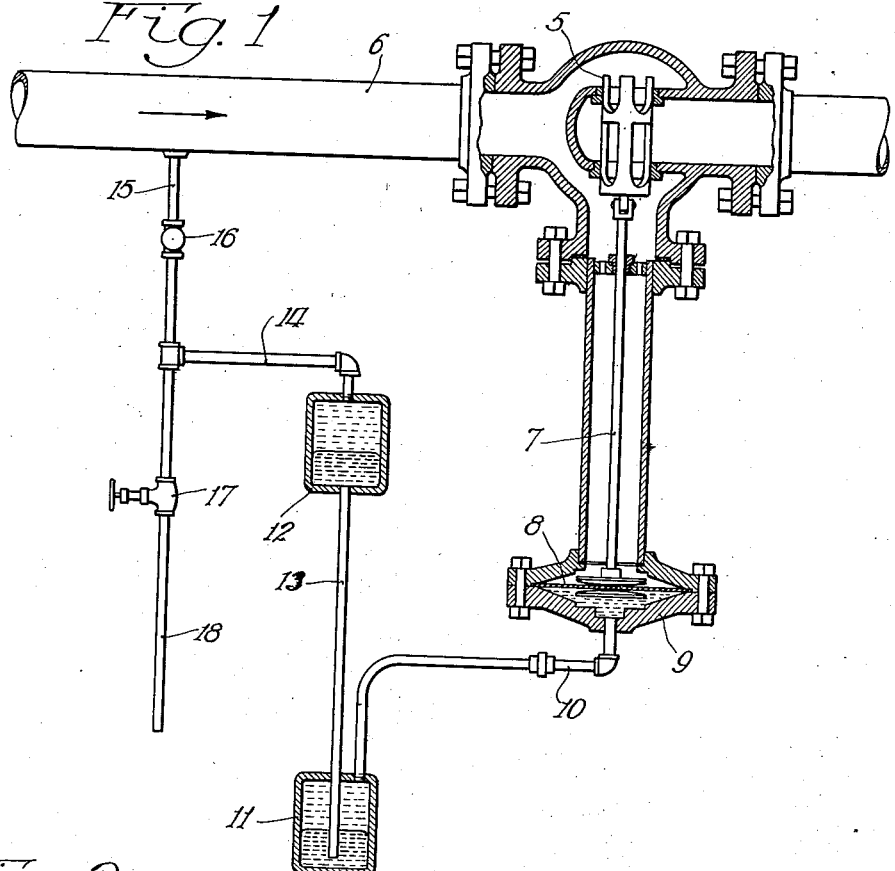
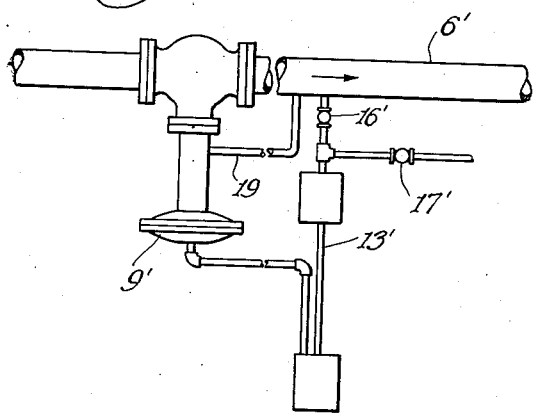
Inventor
Kenneth B. Howell
By:

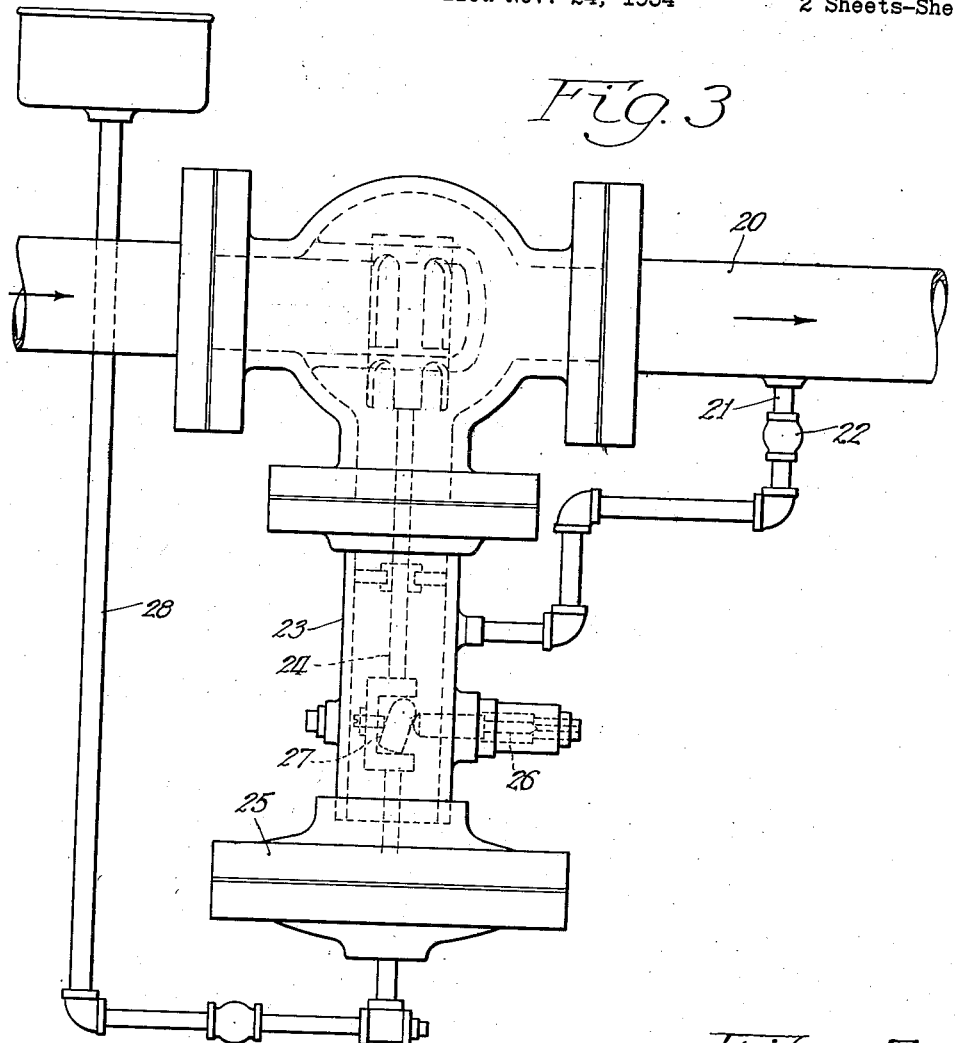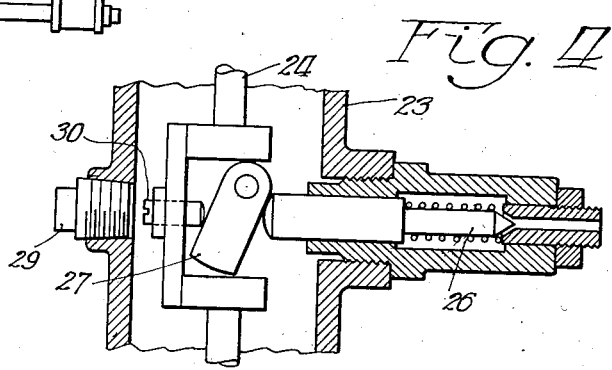

Patented Aug. 18, 1936

2,051,299

UNITED STATES PATENT OFFICE 2,051,299

PRESSURE CONTROL DEVICE

Kenneth B. Howell, Milwaukee, Wis.

Application November 24, 1934, Serial No. 754,627

12 Claims. (Cl. 50—12)

This invention relates to fluid pressure control and is particularly directed to systems for controlling and adjusting relatively high pressures of fluid.

Devices for the regulation of pressure or flow commonly employ control valves which are usually of the balanced type, and these valves are actuated by two or more opposing forces operating upon a diaphragm member. It is to this type of control that my invention is particularly applicable.

It is the purpose of this invention to provide a control or regulator which utilizes the principle of the two fluids under pressure opposing each other on opposite sides of a diaphragm in conjunction with means whereby the control or governing pressure may be made of any desired amount without disturbing the accuracy of the control to any practical extent.

I am aware that the fluid column regulator which opposes the controlled pressure by means of a fluid column of predetermined height exerting a distributed pressure against one side of the diaphragm in opposition to the controlled pressure on the other side has been used before. This regulator, however, has its practical limitation, particularly when applied to high control pressures and pressures which must be frequently adjusted. The height to which the fluid column may extend is often limited by the space available, and the matter of lengthening or shortening the fluid column by withdrawing or adding fluid is difficult and may result in serious errors.

My invention contemplates the provision of a pressure control system whereby the accuracy of the fluid column by means of which the controlled pressure and the controlling pressure are applied to opposite sides of a diaphragm is retained.

In addition, the limitation as to height of fluid column and adjustability is overcome by the application of an additional controlling pressure to the top of the fluid column. This latter pressure is obtained from a point in the flow line by means of an orifice and needle valve discharging to a low pressure point.

My invention further contemplates in this connection the provision of a novel means whereby the pressure in a conduit may be made to vary or be responsive to some other characteristic of the system such for example as the rate of flow, level, temperature, and the like.

I will describe the preferred form of the invention by reference to the accompanying drawings wherein—

Fig. 1 is a somewhat diagrammatic sketch illustrating the system as applied to a back pressure controller;

Fig. 2 illustrates the invention as applied to a reducing valve pressure control;

Fig. 3 illustrates the application of the invention to the automatic control of pressure in response to rate of flow; and Fig. 4 is an enlarged view of a part of the mechanism shown in Fig. 3.

Referring now in detail to the drawings, the invention is shown in Fig. 1 as applied to a balanced valve 5 located in the pressure line 6 which it is proposed to control. The valve 5 is operated by means of the valve stem 7 which projects down and is connected to the diaphragm 8 within the diaphragm chamber 9. The upper side of this diaphragm 8 is exposed to the pressure in the line 6, while the lower side is subjected to a fluid pressure entering the diaphragm chamber through the pipe 10. This fluid pressure is derived from a fixed column consisting of the mercury in pots 11 and 12 and the pipe or column 13 connecting them and from an added pressure applied to the top of the mercury column by means of the pipe 14.

This added pressure is obtained from a bleed-off pipe 15 from the pressure line 6. This bleed-off pipe passes the fluid through an orifice 16 and a needle valve 17, discharging from the needle valve through pipe 18 to atmosphere or any suitable point of constant low pressure. Pipe 14 is connected to pipe 15 between the orifice and the needle valve so that the intermediate pressure superposed on top of the liquid column will bear a direct relationship to the pressure above the orifice 16.

For example, if the area of the opening of the needle valve is of the proper size with respect to that of the fixed orifice 16, other factors being allowed for, then a pressure superposed upon the pot 12 may be made two thirds of the pressure in the flow line 6. Since in this case the diaphragm is balanced between two pressures, one of which is the pressure of a fluid column plus two thirds the pressure in the flow line, the regulator will function at all times to maintain the flow pressure at a value three times the equivalent pressure of the fixed fluid column. Thus, if a fluid column exerting a 50 pound pressure is applied to the diaphragm with the conditions as above stated, the flow pressure would be 150 pounds. By proper selection of the orifice openings, the control pressure can thus be accurately maintained constant at any desired value greater than that of the applied fluid column.

This principle as above described is applicable to any desired ratio of orifice area between the fixed orifice and the needle valve orifice. Obviously both of the orifices may be adjustable if desired.

It will be noted that with the arrangement above described the height of the fluid column may be made such as to be convenient for the particular installation, and the control pressure may be then established by adjustment of the relative areas of the needle valve orifice and the fixed orifice. All of the advantages of the fluid column type of regulator are obtained in this system.

In Fig. 2, I have shown the invention as applied to the control of pressure by means of a reducing valve wherein the pressure at a remote point is to be maintained constant. In this instance, the bleed-off is taken from the outlet side of the flow line 6' and is conducted through suitable orifices 16' and 17', the intermediate pressure being applied from the top of the fluid column 13' which in turn is connected to the bottom of the diaphragm chamber 9'. The functioning of this device is substantially the same as in the first form shown.

It is evident that the point of control from which the pressure through pipe 19 is applied to the diaphragm may be taken on either side of the valve and at either a remote point or close to the valve as desired. Fig. 1 shows the diaphragm pressure obtained direct from flow line 6 at the valve while in Fig. 2 (the reducing valve type) the pressure is returned to the diaphragm through pipe 19 from a remote point.

Referring now to Fig. 3, I have shown another form of the invention embodying the same principles, but in this case there is included the feature of automatic control or variation of the pressure in response to some distinct conditions.

In many industries there arise problems of pressure regulation where it is desired to effect a pressure reduction of a flowing fluid under circumstances where the amount of reduction of the pressure will increase with the rate of flow. This is particularly true in gas transmission service where frictional resistance of pipe lines being dependent upon flow necessitates the establishment of pressure in the system based upon the demand. To meet the needs of this situation, it has heretofore been the practice to manually adjust and set the regulator pressures as demand conditions require.

With the present invention, it is possible to automatically adjust the control pressure in such a fashion that the pressure increases as the demand increases so as to give a constant pressure at the remote point of delivery. Thus, in reference to Fig. 1, if the needle valve in that type of structure is automatically actuated by means which reflect the rate of flow, then the controlled pressure will be automatically regulated to correspond to demand rates.

The automatic setting of the adjustable orifice or needle valve in response to flow measurement may be accomplished in several ways. In Fig. 3, I have illustrated a method whereby this result may be accomplished. Since the valve position of the pressure regulator is in itself a measure of rate of flow, the movement of the valve stem transmitted to the needle valve adjusts the controlled pressure in accordance with the rate of flow as desired.

In the structure shown in Fig. 3, the flow line is shown at 20, and the bleed line is taken off the outlet side at 21 through a fixed orifice 22 into the sealed chamber 23 through which the valve stem 24 projects. Within the chamber 24, which incidentally is open to the upper side of the diaphragm 25, I provide means whereby the vertical movement of the valve stem 24 operates to control a needle valve 26 and thereby govern the amount of bleed-off from the chamber 23 and thus the pressure within the chamber 23. When the pressure in the outlet line 20 is reduced, for example by an increase in demand at the remote point, the effect is transmitted through the fixed orifice 22 to the chamber 23 and results in a temporary drop in pressure in the chamber 23. This causes the diaphragm, the lower side of which is subjected to the fixed pressure of the column 28, to rise thus increasing the fluid flow through the valve in the fluid line.

However, it is desired to compensate for the additional frictional loss in the line due to the increased flow so as to maintain the distinct pressure constant. Therefore, it is necessary not only to regulate the original pressure in the line 20, but to increase the pressure at this point. As the cam 27 is moved upwardly with the valve stem, this permits the needle valve A to open a little wider thus further reducing the pressure in the chamber 23 and resulting in an overcorrection of the pressure loss in the line 20 to take care of the increased flow. In this way the flow control may be made such as to give any desired increase within the available limits of the pressure in the line 20 in response to increase in flow to take care of the demand. It is obvious that the cam 27 may be set for any desired position so as to govern the rate of correction in response to the rate of change of flow.

The seat of the valve 26 as shown is made adjustable to permit taking up wear of the parts, and a plug 29 is provided for obtaining access to the interior of the chamber 23 where the slope of the cam 27 may be adjusted by the screw 30.

From the above description, it is believed that the construction and operation of this device will be clear to those skilled in this art and the advantages thereof readily apparent.

Having thus described my invention, what I claim as new and desire to secure by Letters Patent is:

1. A pressure regulator system comprising a fluid conduit in which the pressure is to be controlled, a valve for controlling the pressure in said conduit, a diaphragm connected to said valve for operating the same, means providing a fixed fluid column acting upon said diaphragm directly to control said valve, and means augmenting the fluid column control comprising a bleed conduit from the controlled pressure conduit, said bleed conduit having spaced orifices provided therein, and a third conduit intermediate said orifices having connections for directing the pressure therein upon the diaphragm.

2. A pressure regulator system comprising a fluid conduit in which the pressure is to be controlled, a valve for controlling the pressure in said conduit, a diaphragm connected to said valve for operating the same, means providing a fixed fluid column acting upon said diaphragm directly to control said valve, and means augmenting the fluid column control comprising a bleed conduit from the controlled pressure conduit, said bleed conduit having spaced orifices provided therein, and a third conduit intermediate said orifices having connections for directing the pressure therein upon the diaphragm, and means for varying the size of one of said orifices to thereby control the pressure in said third conduit.

3. A pressure regulator system comprising a fluid conduit in which the pressure is to be controlled, a valve for controlling the pressure in said conduit, a diaphragm connected to said valve for operating the same, means providing a fixed fluid column acting upon said diaphragm directly to control said valve, and auxiliary control means comprising a bleed conduit from the controlled pressure conduit, said bleed conduit having spaced orifices provided therein, and a third conduit intermediate said orifices having connections for directing the pressure therein upon the diaphragm, and means automatically responsive to outside conditions requiring adjustments of the controlled pressure for varying the size of one of said orifices to thereby control the pressure in said third conduit.

4. A pressure regulator system comprising a fluid conduit in which the pressure is to be controlled, a valve for controlling the pressure in said conduit, a diaphragm connected to said valve for operating the same, means providing a fixed fluid column acting upon said diaphragm directly to control said valve, and auxiliary control means comprising a bleed conduit from the controlled pressure conduit, said bleed conduit having spaced orifices provided therein, and a third conduit intermediate said orifices having connections for directing the pressure therein upon the diaphragm, and means actuated by movement of said valve for varying the size of one of said orifices to thereby control the pressure in said third conduit.

5. A pressure regulator system comprising a fluid conduit in which the pressure is to be controlled, a valve for controlling the pressure in said conduit, a diaphragm connected to said valve for operating the same, means providing a fixed fluid column acting upon said diaphragm directly to control said valve, and auxiliary control means comprising a bleed conduit from the controlled pressure conduit, said bleed conduit having spaced orifices provided therein, and a third conduit intermediate said orifices having connections for directing the pressure therein upon the diaphragm, and means actuated by movement of said valve for varying the size of one of said orifices to thereby control the pressure in said third conduit, said last named means comprising a needle valve controlling the orifice, a stem for said valve, and cam means movable with the pressure controlling valve for moving said stem.

6. Means for controlling a high pressure in a conduit, from a fixed fluid column having a maximum pressure that is only a fraction of the controlled pressure which comprises a valve in said conduit, a diaphragm for moving said valve, means providing a fixed fluid column in communication with said diaphragm, and means to balance the diaphragm between the fixed column pressure and the controlled pressure comprising a bleed conduit leading from said controlled pressure conduit, said bleed conduit having spaced orifices therein, and a third conduit tapping the bleed conduit between said orifices and open to the diaphragm to supply the difference in pressure between the fixed column pressure and the controlled pressure.

7. Means for controlling a high pressure in a conduit, from a fixed fluid column having a maximum pressure that is only a fraction of the controlled pressure which comprises a valve in said conduit, a diaphragm for moving said valve, means providing a fixed fluid column in communication with said diaphragm, and means to balance the diaphragm between the fixed column pressure and the controlled pressure comprising a bleed conduit leading from said controlled pressure conduit, said bleed conduit having spaced orifices therein, and a third conduit tapping the bleed conduit between said orifices and open to the diaphragm to supply the difference in pressure between the fixed column pressure and the controlled pressure, said third conduit opening directly into the fluid column, and the controlled pressure being connected to the other side of the diaphragm.

8. Means for controlling a high pressure in a conduit, from a fixed fluid column having a maximum pressure that is only a fraction of the controlled pressure which comprises a valve in said conduit, a diaphragm for moving said valve, means providing a fixed fluid column in communication with said diaphragm, and means to balance the diaphragm between the fixed column pressure and the controlled pressure comprising a bleed conduit leading from said controlled pressure conduit, said bleed conduit having spaced orifices therein, and a third conduit tapping the bleed conduit between said orifices and open to the diaphragm to supply the difference in pressure between the fixed column pressure and the controlled pressure, said third conduit opening directly into the fluid column and the controlled pressure being connected to the other side of the diaphragm, one of said orifices having means to vary its size for controlling the pressure between said orifices.

9. Means for controlling a high pressure in a conduit, from a fixed fluid column having a maximum pressure that is only a fraction of the controlled pressure which comprises a valve in said conduit, a diaphragm for moving said valve, means providing a fixed fluid column in communication with said diaphragm, and means to balance the fixed column pressure and the controlled pressure comprising a bleed conduit leading from said controlled pressure conduit, said bleed conduit having spaced orifices therein, and a third conduit tapping the bleed conduit between said orifices and open to the diaphragm, said third conduit opening upon the opposite side of diaphragm from the fluid column.

10. A pressure regulator system comprising a fluid conduit in which the pressure is to be controlled, a valve for controlling the pressure in said conduit, a diaphragm connected to said valve for operating the same, means connecting one side of the diaphragm to the fluid conduit, means providing a fixed fluid column acting upon the other side of said diaphragm directly to control said valve, and means augmenting the fluid column control comprising a bleed conduit from the controlled pressure conduit, said bleed conduit having spaced orifices provided therein, and a third conduit intermediate said orifices having connections for directing the pressure therein upon the diaphragm.

11. Means for controlling a high pressure in a conduit from a pressure device having a maximum pressure exerting ability that is only a fraction of the controlled pressure, said means comprising a valve for said conduit controlling the pressure therein, a diaphragm connected to said valve for operating the same, the pressure device acting directly on the diaphragm, and means to balance the diaphragm between the pressure of said device and the controlled pressure comprising a bleed conduit leading from said controlled pressure conduit, said bleed conduit having spaced orifices therein, and a third conduit tapping the bleed conduit between said orifices and open to the diaphragm to supply the difference in pressure between the fixed column pressure and the controlled pressure.

12. Means for controlling a high pressure in a conduit from a pressure device having a maximum pressure exerting ability that is only a fraction of the controlled pressure, said means comprising a valve for said conduit controlling the pressure therein, a diaphragm connected to said valve for operating the same, the pressure device acting directly on the diaphragm, and means to balance the diaphragm between the pressure of said device and the controlled pressure comprising a bleed conduit leading from said controlled pressure conduit, said bleed conduit having spaced orifices therein, and a third conduit tapping the bleed conduit between said orifices and open to the diaphragm to supply the difference in pressure between the fixed column pressure and the controlled pressure, and means actuated by movement of said valve for varying the size of one of said orifices to thereby control the pressure in said third conduit.

KENNETH B. HOWELL.